United States Patent
Hensman et al.

(10) Patent No.: US 10,733,483 B2
(45) Date of Patent: Aug. 4, 2020

(54) METHOD AND SYSTEM FOR CLASSIFICATION OF DATA

(71) Applicant: Prowler.io Limited, Cambridge (GB)

(72) Inventors: James Hensman, Cambridge (GB); Mark Van Der Wilk, Cambridge (GB); Vincent Dutordoir, Cambridge (GB)

(73) Assignee: PROWLER.IO LIMITED, Cambridge (GB)

( * ) Notice: Subject to any disclaimer, the term of this patent is extended or adjusted under 35 U.S.C. 154(b) by 0 days.

(21) Appl. No.: 16/824,033

(22) Filed: Mar. 19, 2020

(65) Prior Publication Data
US 2020/0218932 A1 Jul. 9, 2020

Related U.S. Application Data

(63) Continuation of application No. PCT/EP2019/069137, filed on Jul. 16, 2019.

(30) Foreign Application Priority Data

Nov. 30, 2018 (EP) .................. 18209635

(51) Int. Cl.
*G06K 9/62* (2006.01)
*G06N 20/00* (2019.01)
*G06N 7/00* (2006.01)

(52) U.S. Cl.
CPC ........... *G06K 9/628* (2013.01); *G06K 9/6256* (2013.01); *G06K 9/6278* (2013.01); *G06N 7/005* (2013.01); *G06N 20/00* (2019.01); *G06K 2209/01* (2013.01)

(58) Field of Classification Search
CPC .... G06K 9/628; G06K 9/6256; G06K 9/6278; G06K 2209/01; G06N 7/005; G06N 20/00

(Continued)

(56) References Cited

U.S. PATENT DOCUMENTS

| | | | | |
|---|---|---|---|---|
| 5,825,925 A | * | 10/1998 | Baird | .................. G06K 9/6228 382/225 |
| 6,052,483 A | * | 4/2000 | Baird | ....................... G06K 9/46 382/190 |
| 8,731,317 B2 | * | 5/2014 | Sanchez | ............... G06K 9/4676 382/224 |
| 9,159,123 B2 | * | 10/2015 | Rastegari | ................ G06T 5/005 |
| 9,298,981 B1 | * | 3/2016 | Ragnet | ............... G06K 9/00442 |

(Continued)

OTHER PUBLICATIONS

Blomqvist et al, "Deep Convolutional Gaussian Processes", Cornell University Library, 201 Olin Library Cornell University Ithaca, NY, Oct. 6, 2018, 9 pages.

(Continued)

*Primary Examiner* — Jerome Grant, II
(74) *Attorney, Agent, or Firm* — Kilpatrick Townsend & Stockton LLP

(57) ABSTRACT

A method includes: receiving training data comprising a plurality of training data items, each training data item labelled under a respective class and comprising a elements arranged in conformity with a structured representation having an associated coordinate system; determining patches of the training data, each patch comprising a subset of the elements of a respective training data item and being associated with a location within the co-ordinate system of the structured representation; and initialising a set of parameters for a Gaussian process. The method further includes iteratively: processing pairs of the determined patches, using a patch response kernel to determine patch response data; determining, using the patch response data, entries of a covariance matrix; and updating the set of parameters in dependence on the determined entries of the covariance matrix. The patch response kernel takes into account the locations associated with patches within the co-ordinate system of the structured representation.

20 Claims, 7 Drawing Sheets

(58) Field of Classification Search
USPC .......................................................... 382/161
See application file for complete search history.

(56) References Cited

U.S. PATENT DOCUMENTS

| | | | | |
|---|---|---|---|---|
| 2007/0258648 | A1* | 11/2007 | Perronnin | G06K 9/726 382/224 |
| 2008/0069456 | A1* | 3/2008 | Perronnin | G06K 9/4671 382/228 |
| 2012/0155766 | A1* | 6/2012 | Zhang | G06F 16/5838 382/173 |
| 2014/0247461 | A1* | 9/2014 | Willamowski | G06Q 10/06398 358/1.15 |
| 2015/0235160 | A1* | 8/2015 | Larlus-Larrondo | G06Q 10/06398 705/7.42 |
| 2016/0078359 | A1* | 3/2016 | Csurka | G06K 9/6262 706/12 |
| 2016/0132750 | A1* | 5/2016 | Yang | G06F 16/56 382/197 |
| 2018/0053057 | A1* | 2/2018 | De Souza | G06K 9/6259 |
| 2020/0019816 | A1* | 1/2020 | Zhang | G06K 9/00664 |

OTHER PUBLICATIONS

Markov et al, "Music Genre Classification using Gaussian Process Models", 2013 IEEE International Workshop on Machine Learning for Signal Processing, Sep. 1, 2013, 7 pages.

Van Der Wilk et al, "Convolutional Gaussian Processes", Cornell University Library, 201 Olin Library Cornell University Ithaca, NY, Sep. 6, 2017, 18 pages.

International Search Report and Written Opinion issued in International Application No. PCT/EP2019/069137, dated Oct. 29, 2019.

* cited by examiner

METHOD AND SYSTEM FOR CLASSIFICATION OF DATA

The present application is a continuation application of International Application No. PCT/EP2019/069137, filed on Jul. 16, 2019, which claims priority benefit of European Patent Application No. 18209635.4, filed Nov. 30, 2018. The entire contents of the aforementioned applications are herein incorporated by reference for all purposes.

TECHNICAL FIELD

The present invention relates to methods and systems for classification of data. The invention has specific, but not exclusive, relevance to the classification of image data.

BACKGROUND

Classification of data involves identifying which of a set of predetermined classes a given data item is associated with. An example of data classification is the classification of images of handwritten digits according to which digit they represent. Probabilistic classification involves estimating probabilities of a given data items being associated with each of a set of predetermined classes. In recent years, significant developments in neural networks have resulted in increasingly accurate and efficient machine learning methods for classification of data. Alongside neural networks, computational methods based on Bayesian statistics have been developed and applied to classification problems. Gaussian process (GP) models are of particular interest due to the flexibility of GP priors, which allows for complex nonlinear latent functions to be learned. Compared with neural network models, GP models automatically result in well-calibrated uncertainties in class probability predictions. GP models are particularly suitable for low-data regimes, in which prediction uncertainties may be large, and must be modelled sensibly to give meaningful classification results.

Application of GP models to classification of data is typically computationally demanding due to non-Gaussian likelihoods that prevent integrals from being performed analytically. For large datasets, nave application of GP models to classification problems becomes intractable even for the most powerful computers. Methods have been developed to improve the tractability and scalability of GP models for classification.

In addition to the tractability issues mentioned above, most GP models rely on rudimentary and local metrics for generalisation (for example, Euclidian distances between data items), and accordingly do not adequately capture non-local generalisation structures. Recently, a method was proposed to incorporate convolutional structure into GP models (*Convolutional Gaussian Processes*, van der Wilk et al, 31$^{st}$ Conference on Neural Information Processing Systems, 2017). The proposed method results in translational invariance across input dimensions of the data to be classified, allowing for non-local generalisation.

Introducing a convolutional structure as described above improves the performance of GP models for classification, but does not adequately capture information depending on the structural relationship between input dimensions in high-dimensional data (for example, the relative locations of pixels within an image). As a result, existing GP models are typically outperformed in classification tasks by state-of-the-art neural networks which are capable of capturing such structural relationships.

SUMMARY

According to a first aspect of the present invention, there is provided a computer-implemented method of training a computer system to determine a probability of a data item being associated with a given class of a plurality of classes. The method includes: receiving training data comprising a plurality of training data items, each training data item being labelled under a respective class and comprising a plurality of elements arranged in conformity with a structured representation having an associated co-ordinate system; determining patches of the training data, each patch comprising a subset of the elements of a respective training data item and being associated with a location within the co-ordinate system of the structured representation; and initialising a set of parameters for a Gaussian process (GP). The method further includes iteratively: processing the determined patches, using a patch response kernel, to determine patch response data; determining, using the determined patch response data, entries of a covariance matrix; and updating the set of parameters in dependence on the determined entries of the covariance matrix. The patch response kernel takes into account the locations associated with patches within the co-ordinate system of the structured representation.

According to a second aspect of the present invention, there is provided a computer implemented method of determining a probability of a data item being associated with a given class of a plurality of classes, the data item comprising a plurality of elements arranged in conformity with a structured representation having an associated co-ordinate system. The method includes: storing a set of parameters for a Gaussian process (GP); determining patches of the data item, each patch comprising a subset of the elements of the data item and being associated with a location within the co-ordinate system of the structured representation; processing the determined patches, using a patch response kernel, to determine patch response data; processing the patch response data to determine a covariance value; determining, using the determined covariance value and the stored set of parameters of the variational GP, a probability distribution of a global response function evaluated at the data item; and determining, using the determined probability distribution, a probability of the data item being associated with the given class. The patch response kernel takes into account the locations associated with patches within the co-ordinate system of the structured representation.

Providing that the patch response kernel takes into account the locations associated with patches within the co-ordinate system of the structured representation allows the resulting model to take into account locations of features within the structured representation, in addition to the features themselves, whilst retaining a degree of translation insensitivity. This is advantageous, for example, for accurate classification of images.

Further features and advantages of the invention will become apparent from the following description of preferred embodiments of the invention, given by way of example only, which is made with reference to the accompanying drawings.

DETAILED DESCRIPTION

Translation Insensitive Convolutional Kernels

Figure 1:
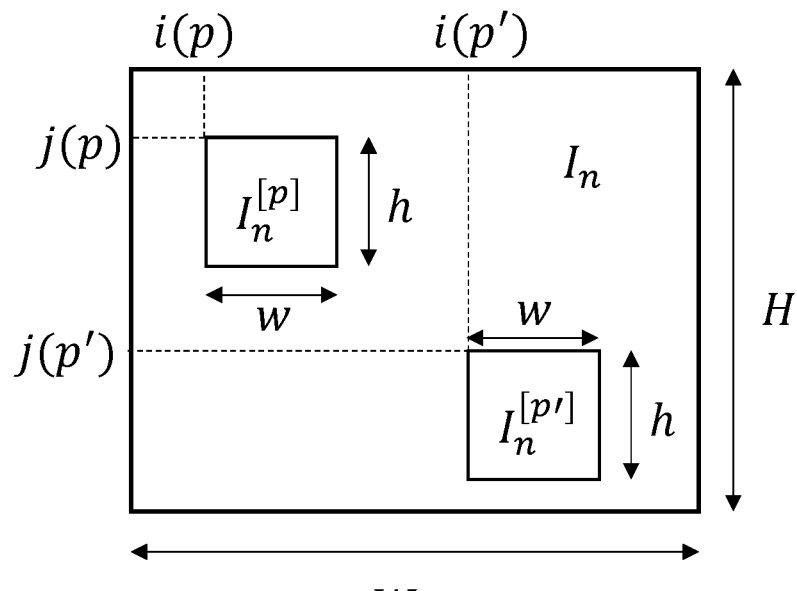
FIG. 1 shows a structured representation of an image.

FIG. 1 shows an image $I_n$ corresponding to an image data vector $x_n$. The image data vector $x_n$ is taken from a training dataset $X=\{x_n\}_{n=1}^{N}$ containing a set of N image data vectors representing N labelled training images $\{I_n\}_{n=1}^{N}$. Each training image has an associated class label $\gamma_n$ corresponding to one of C classes $C_1, C_2, \ldots, C_c$.

Each of the labelled training images contains $D=W\times H$ pixels. In the present example, the images are greyscale images, with elements of the corresponding image data vectors corresponding to pixel intensities. Each image vector therefore contains D elements, such that $x_n \in \mathbb{R}^D$ for $n=1, 2, \ldots, N$. In other the examples, image data may include colour images, and accordingly image data vectors may include elements corresponding to each of several colour channels, such as red, green and blue colour channels.

The visual representation of the image $I_n$ shown in FIG. 1 is an example of a structured representation of the image data vector $x_n$. Elements of the image data vector $x_n$ are arranged in conformity with an associated co-ordinate system of the structured representation, such that each element of the image data vector $x_n$ has an associated pair of co-ordinates in the structured representation.

The image $I_n$ may be considered to include P image patches $\{I_n^{[p]}\}_{p=1}^{P}$, each including $E=w\times h$ pixels (each of which may have multiple colour channels). In the present example, adjacent image patches are overlapping and separated by one pixel in each direction, and therefore the total number of image patches in each image is given by $P=w+1)\times(H h+1)$. In other examples, adjacent patches may be separated by other numbers of pixels, analogous to using different strides for convolutional filters in convolutional neural networks (CNNs). The image patches are represented by patch vectors $\{x_n^{[p]}\}_{p=1}^{P}$, each including a subset of the elements of the image vector $x_n$. In FIG. 1, a first image patch $I_n^{[p]}$ is associated with a first location within the co-ordinate system of the structured representation, and a second image patch $I_n^{[p']}$ associated with a second location within the co-ordinate system of the structured representation. In the present example, each image patch is associated with a pixelwise location of the top-left pixel of the image patch. In other examples, a patch may be associated with a location differently, for example with a pixelwise location of a central pixel of the image patch. In FIG. 1, the first image patch $I_n^{[p]}$ is associated with the Cartesian co-ordinates (i(p), j(p)) and the second image patch $I_n^{[p']}$ is associated with the Cartesian co-ordinates (i(p'), j(p')), where the functions i(•) and j(•) return Cartesian co-ordinates associated with an image patch in the structured representation.

In order to construct a GP model with a convolutional structure, a patch response function g: $\mathbb{R}^E \to \mathbb{R}$ is introduced that maps patches to patch response values. The patch response function is given a GP prior as shown in Equation (1):

$$g \sim GP\big(0, k_g\big((x_n^{[p]}, i(p), j(p)), (x_m^{[p']}, i(p'), j(p'))\big)\big), \quad (1)$$

where $k_g$ is referred to as the patch response kernel. A global response function $f: \mathbb{R}^D \to \mathbb{R}$ is defined as a weighted sum of the patch response functions for each of the patches in the image, as shown in Equation (2):

$$f(x) = \sum_{p=1}^{P} \alpha_p g(x^{[p]}), \quad (2)$$

where in the present example $\{\alpha_p\}_{p=1}^{P}$ is a set of unknown weights to be learned, though in other p=examples the weights may be predetermined, for example all being set to unity. The GP prior on g shown in Equation (1) results in a GP prior on $f$, given by Equation (3):

$$f \sim GP(0, k(x_n, x_m)), \quad (3)$$

where the global response kernel k is given by Equation (4):

$$k(x_n, x_m) = \sum_{p=1}^{P}\sum_{p'=1}^{P} \alpha_p \alpha'_{p'} k_g\big((x_n^{[p]}, i(p), j(p)), (x_m^{[p']}, i(p'), j(p'))\big). \quad (4)$$

The present method differs from previous methods in that the patch response kernel $k_g$ takes into account not only the elements of the image patches, but also the pixelwise locations associated with the image patches within the co-ordinate system of the structured representation. As a result, the GP over $f$ is able to learn to take into account locations of features within an image, in addition to the appearance of the features, as will be explained hereafter with reference to an example.

In a specific example, the patch response kernel $k_g$ is formed as a product of a patch component $k_{patch}$ that takes into account the elements of the image patches, and a location component $k_{loc}$ that takes into account the locations of the patches, as shown by Equation (5):

$$k_g\big((x_n^{[p]}, i(p), j(p)), (x_m^{[p']}, i(p'), j(p'))\big) = \quad (5)$$
$$k_{patch}(x_n^{[p]}, x_m^{[p']}) \times k_{loc}((i(p), j(p)), (i(p'), j(p'))).$$

The patch component $k_{patch}$ and the location component $k_{loc}$ may each be any kernel suitable for GP models. Examples of suitable kernels include squared exponential kernels, Matérn kernels, Ornstein-Uhlenbeck kernels, and periodic kernels. The choice of kernel will depend on the specifics of the classification task. For example, a periodic kernel may be chosen for $k_{loc}$ if the images to be classified are expected to exhibit periodicity on the scale of the image. Furthermore, particular kernels may have attractive properties for implementation, depending on the computational implementation being employed.

Figure 2:
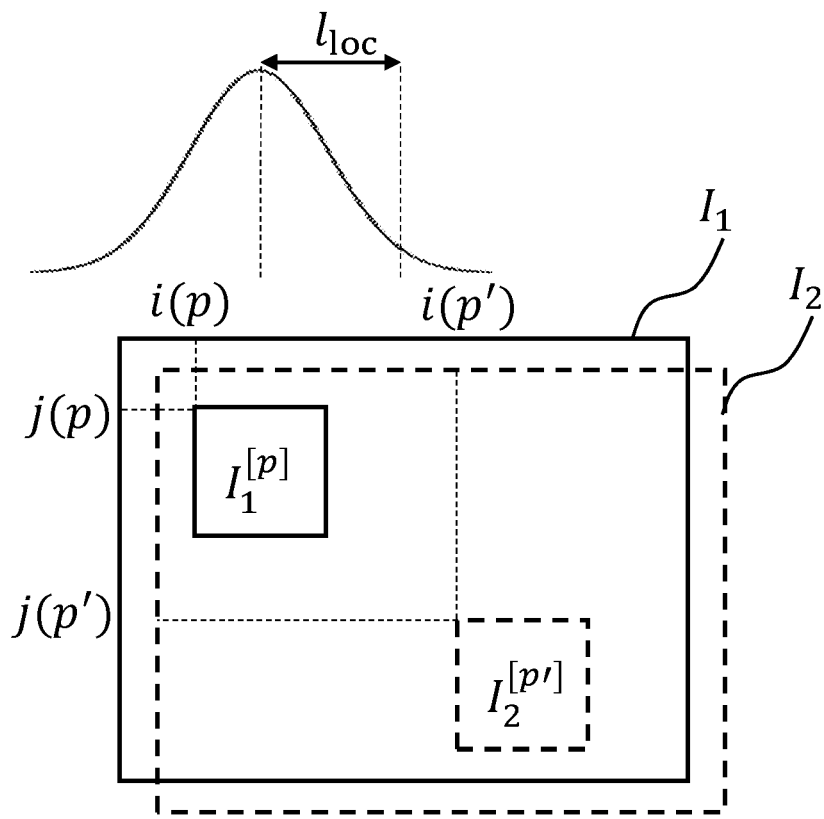
FIG. 2 shows structured representations of two images in a training dataset.

FIG. 2 illustrates the effect of providing a patch response kernel that takes into account the locations of image patches. FIG. 2 shows two overlaid images $I_1$, $I_2$, containing image patches $I_1^{[p]}$, $I_2^{[p']}$ respectively. The image patch $I_1^{[p]}$ is associated with pixelwise co-ordinates (i(p), j(p)) in the image $I_1$, and the image patch $I_2^{[p']}$ is associated with pixelwise co-ordinates (i(p'), j(p')) in the image $I_2$. The output of the patch response kernel $k_g$ in this example depends on the Euclidian distance $|x_1^{[p]}-x_2^{[p']}|$ between the patch vectors $x_1^{[p]}$ and $x_2^{[p']}$, which captures the similarity of the image patches $x_1^{[p]}$ and $x_2^{[p']}$. In other examples, alternative metrics may be used to capture similarities between image patches. The output of the kernel $k_g$ also depends on the locations (i(p), j(p)) and (i(p'), j(p')) of the image patches. In this example, the patch response kernel $k_g$ is a functions of the distance $$\sqrt{(i(p)-i(p'))^2 + (j(p)-j(p'))^2}$$

between the locations associated with the image patches. In other examples, the output of a patch response kernel may depend on locations associated with patches in a different way. For example, for certain classification tasks it may be appropriate to construct a patch response kernel $k_g$ whose output depends only on the vertical separation of image patches, or depends differently on the vertical and horizontal separation of image patches (for example, if the image is expected to exhibit periodicity in only one of these directions). The dependence of the output of $k_g$ on the locations of the image patches allows the patch response function to capture information relating to the location of the patch, and accordingly provides the global response function with information relating to the location of features within an image. By contrast, a kernel whose output depends only on similarities between image patches results in a global response function that does not adequately take into account the locations of features within an image, as the probabilistic model will favour the simplest explanation of the data.

The sensitivity of the patch response function g, and in turn the global response function f, to patch location depends on the functional dependence of $k_g$ on the locations of the image patches, which may in turn depend on one or more hyperparameters of $k_g$. For example, the sensitivity of the patch response function to patch location (referred to as translation sensitivity) may depend on a length scale hyperparameter $l_{loc}$ encoding a characteristic length scale associated with the locational dependence of the patch response kernel. In FIG. 2, the covariance of image patches with the patch $I_1^{[p]}$ is illustrated in the case where $k_g$ has a product structure as shown in Equation (5), and the location component $k_{loc}$ is a squared exponential kernel. In this case, the length scale hyperparameter $l_{loc}$ is smaller than the width W of the image, and accordingly correlations between image patches that are distant from each other will have a relatively small contribution to the patch response function g and the global response function f. By contrast, correlations between image patches that are near to each other will have a relatively large contribution to the patch response function g and the global response function f. Although for certain applications it may be desirable to configure the translation sensitivity manually (for example by fixing or restricting the length scale hyperparameter of a location component), in most examples it will be advantageous to allow the translation sensitivity to be learned in order to fit the training data, for example by optimising the length scale hyperparameter associated with the location dependence of the patch response kernel, as will be described in more detail hereafter.

Figure 3:
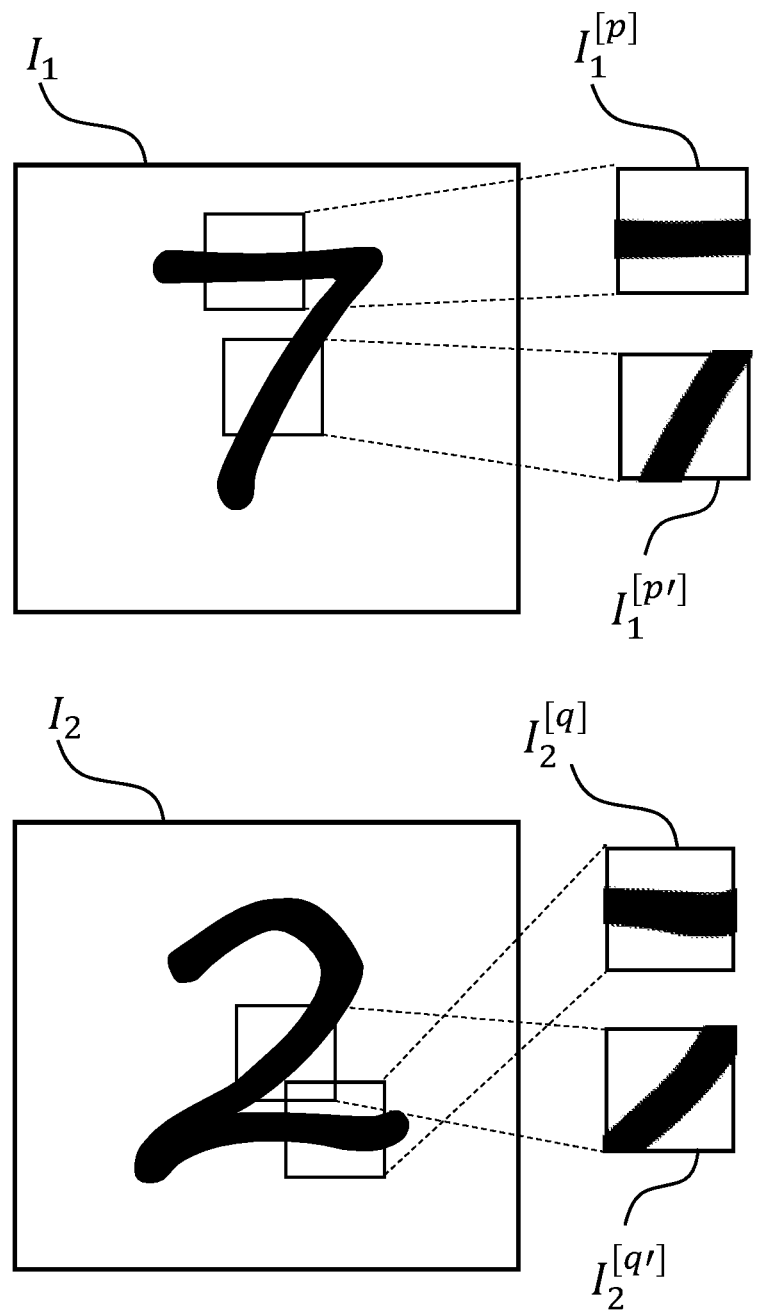
FIG. 3 shows image patches in two images of handwritten numbers.

FIG. 3 shows an example of two images $I_1$ and $I_2$ of handwritten digits. The images $I_1$ and $I_2$ include the image patches $I_1^{[p]}$, $I_1^{[p']}$, and $I_2^{[q]}$, $I_2^{[q']}$ respectively. It is observed that, although the images $I_1$ and $I_2$ show different digits ($I_1$ showing a handwritten number 7, and $I_2$ showing a handwritten number 2), the image patch $I_1^{[p]}$ is very similar in appearance to the image patch $I_2^{[q]}$, and the image patch $I_1^{[p']}$ is very similar in appearance to the image patch $I_2^{[q']}$. If the patch response kernel $k_g$ were to depend only on similarities between image patches, the patch responses for the similar patches would be very similar. Although in this case the global response function f may still have some sensitivity to the location of the image patches due to the weight parameters $\alpha_p$, in practice it is observed that such models are unable to account for the location of features adequately for accurate classification of images. In the example of FIG. 3, such a model may have difficulty distinguishing between the handwritten 7 and the handwritten 2, based on the image patches shown. By contrast, providing that kg depends also on the locations of the image patches, for example by virtue of a product structure as shown in Equation (5), allows for improved sensitivity to the location of features within an image. In the example of FIG. 3, the image patches $I_1^{[p]}$ and $I_2^{[q]}$ have different locations in the respective images $I_1$ and $I_2$, and accordingly would result in different outputs of the patch response function and accordingly different contributions to the global response functions.

Accordingly, the resulting GP model would be more capable of distinguishing between the handwritten 7 and the handwritten 2, based on the image patches shown.

Comparing the present method with existing GP models for classification, a conventional additive GP model in which a prior is constructed as a sum over input dimensions exhibits translation dependence, resulting in a latent response function that is highly dependent on the location of features, and accordingly does not generalise well. On the other hand, a GP model based on a convolutional structure with a patch response function that does not depend on patch location exhibits translation invariance, and accordingly does not capture information depending on the locations of features within an image. The present method does not belong to either of these two extremes, and may instead be said to exhibit translation insensitivity, which balances capacity to generalise with the capacity to capture information related to the locations of features within an image. Accordingly, the kernel given by Equation (4) is referred to as a Translation Insensitive Convolutional Kernel (TICK). Furthermore, since the degree of translation sensitivity may be learned in order to fit the data, the translation sensitivity of the present method may automatically be adapted to fit a given training dataset.

Training Phase for Binary Classification Binary classification involves classifying data into one of C=2 possible classes. In the present section, a method for performing binary classification will be described in accordance with the present invention. Binary classification is a special case of more general multi-class classification, in which data is classified into one of C>2 possible classes.

The present classification method is an example of a Bayesian inference scheme. The method includes a training phase and a classification phase. The training phase is based on an application of Bayes' theorem as given by Equation (6):

$$p(f|y) = \frac{p(y|f)p(f)}{p(y)}, \quad (6)$$

in which:
- $f=\{f(x_n)\}_{n=1}^{N}$ is a set of random variables corresponding to evaluations of the global response function $f$ at the training data items $X=\{x_n\}_{n=1}^{N}$;
- $y=\{y_n\}_{n=1}^{N}$ is a set of class labels assigned to the training data points X;
- p(f|y) is a posterior probability distribution of f conditioned on y;
- p(y|f) is a probability distribution of y conditioned on f, referred to as the likelihood;
- p(f) is a prior probability distribution of f assumed in the model; and
- p(y) is the marginal likelihood.

For classification problems, the likelihood factorises over the data such that $$p(y|f) = \prod_{n=1}^{N} p(y_n|f(x_n)).$$

An appropriate likelihood for binary classification is a Bernoulli likelihood as given by Equation (7):

$$p(y_n|f(x_n)) = \mathcal{B}(y_n|\phi(f(x_n))), \quad (7)$$

where $\mathcal{B}(y_n|\phi(f(x_n))) = \phi(f(x_n))^{y_n}(1-\phi(f(x_n)))^{1-y_n}$ for class labels $y_n \in \{0,1\}$. The response function $\phi(\cdot): \mathbb{R} \to [0, 1]$ can be any sigmoid function. The response function is also referred to as a "squashing function", and is a monotonically increasing function that maps real values to the domain [0, 1], such that the output of the response function may be interpreted as a probability. Examples of response functions include the logistic function $\phi(f(x_n))=1/(1+\exp(-f(x_n)))$ and the probit function $$\phi(f(x_n)) = \int_{-\infty}^{f(x_n)} \mathcal{N}(a|0, 1)da.$$

In the present method, the prior on $f$ is a GP given by Equation (3), where k is the global response kernel given by Equation (4). The prior distribution for f is therefore given by $p(f) = \mathcal{N}(f|0, K_{ff})$, where $K_{ff}$ is an N×N covariance matrix containing evaluations of the $\mathcal{N}$ global response kernel k at each of the training data points, such that $K_{ff}[n,m]=k(x_n, x_m)$. In order to make predictions of class labels of test data, it is necessary to determine or approximate the posterior distribution p(f|y). The posterior distribution p(f|y) consists of evaluations of a posterior process p(f|y) at the training data items. In the present method, the posterior process p(f|y) is approximated by a GP q(f) with marginals specified at M inducing inputs $Z=\{z_m\}_{m=1}^{M}$. In some examples, the inducing inputs $z_m \in \mathbb{R}^P$ are placed in the space of patches as opposed to the space of the training data items to improve the efficiency of implementation, as will be described in more detail hereafter.

The values of the global response function at the inducing inputs are referred to as inducing variables $u=\{f(z_m)\}_{m=1}^{M}$, and are distributed according to a variational distribution q(u). Depending on the specific implementation, the variational distribution q(u) may take a specific form, for example a Gaussian distribution or a mixture of Gaussian distributions, or may be a free-form distribution satisfying a known optimality relation. In the latter case, samples may be drawn from the variational distribution using Markov Chain Monte Carlo (MCMC) techniques.

The training phase proceeds by optimising the variational distribution q(u) to force the approximate posterior process q(f) to fit the training data. Suitable optimisation methods include expectation propagation, Laplace-based methods, Renyi divergence minimisation, and variational Bayesian methods.

Example Implementation

A specific implementation of the above training phase method will now be described. The present implementation is based on a variational Bayesian method. The variational distribution of the inducing variables in this example is Gaussian, given by $q(u) = \mathcal{N}(u|m, S)$. In order to ensure positive-definiteness of the covariance S, a decomposition $S=LL^T$ is imposed, where L is restricted to having a lower triangular form, though in other implementations such decomposition may be unnecessary.

The method proceeds by optimising the variational parameters m, L of the variational normal distribution, along with the inducing inputs Z, with respect to a lower bound of the log marginal likelihood log p(y). Any suitable gradient-based optimisation method may be used, for example ordinary gradient descent, Adam, or Limited-Memory Broyden-Fletcher-Goldfarb-Shanno (L-BFGS), to iteratively update the variational parameters and the inducing inputs until predetermined convergence criteria are satisfied. The lower bound of the log marginal likelihood to be maximised is referred to as the evidence lower bound (ELBO), denoted $\mathcal{L}$, and is given by Equation (8):

$$\mathcal{L} = \sum_{n=1}^{N} \mathbb{E}_{q(f(x_n))}[\log p(y_n|f(x_n))] - KL[q(u)||p(u)], \quad (8)$$

where $p(u) = \mathcal{N}(u|0, K_{uu})$, $\mathbb{E}_{q(f(x_n))}$ denotes the expectation under the marginal distribution $q(f(x_n))$, and KL denotes the Kuller-Leibler divergence. The marginal distributions $q(f(x_n))$ are given by Equation (9):

$$q(f(x_n)) = \mathcal{N}(f(x_n)|\mu_n, \sigma_n^2), \quad (9)$$

where $$\mu_n = k_u(x_n)^T K_{uu}^{-1} m, \quad (10)$$

and $$\sigma_n^2 = k[x_n, x_n] + k_u(x_n)^T K_{uu}^{-1}(S - K_{uu}) K_{uu}^{-1} k_u(x_n), \quad (11)$$

where $K_{uu}$ is an M×M covariance matrix with elements $K_{uu}[n,m]=k(z_n, z_m)$, and $k_u(\cdot)$ is a length M vector-valued function given by $k_u(\cdot)=\{k(\cdot, z_m)\}_{m=1}^{M}$. Elements of $k_u(x_n)$ for n=1, ... N are collected into an M×N covariance matrix $K_{uf}$ with elements $K_{uf}[m, n]=k(z_m, x_n)$.

In addition to being dependent on m, L, Z, the ELBO is dependent on hyperparameters of the global response kernel k, which in the present example includes hyperparameters of the patch response function kg as well as the weights $\{\alpha_p\}_{p=1}^{P}$. As explained above with reference to FIG. 2, for the patch response kernel of Equation (5), hyperparameters of $k_g$ may include a length scale hyperparameter $l_{loc}$ associated with the locational dependence of the patch response kernel, and may further include an additional length scale hyperparameter $l_{patch}$ associated with the element-wise dependence of the patch response kernel. Depending on the form of the patch response kernel, additional or alternative hyperparameters may be included.

For example, the hyperparameters may include variance hyperparameters in the case of a product kernel comprising Matérn kernel components. For best performance of the classification method, during the training phase the hyperparameters, in addition to the variational parameters and the inducing patches, are optimised with respect to the ELBO. In some examples, the hyperparameters and the inducing patches may be combined with the variational parameters and updated in a single update step. In other examples, the hyperparameters and/or the inducing inputs are updated in an inner optimisation loop, and the remaining parameters updated in an outer optimisation loop. It is noted that the variational parameters can be updated using natural gradient descent, whereas the hyperparameters and the inducing inputs cannot be updated using natural gradient descent, as the hyperparameters and the inducing inputs are not associated with a probability distribution, and hence the natural gradient is undefined. For examples in which the variational parameters are updated using natural gradient descent, an effective approach is to update the variational parameters using natural gradient descent followed by updating of the hyperparameters and the inducing inputs using one or more alternative optimisation methods. The resulting hybrid approach alternates between steps of natural gradient descent and the other chosen optimisation method. In a specific example, natural gradient descent is alternated with Adam.

Evaluating $\mathcal{L}$ and derivatives of $\mathcal{L}$ requires evaluation of the covariance matrices $K_{uu}$ and $K_{uf}$, and the diagonal elements of the covariance matrix $K_{ff}$, and subsequently performing the matrix algebra of Equation (11). In the present implementation, the number of kernel evaluations required to evaluate the covariance matrices $K_{uu}$ and $K_{uf}$ is reduced by placing the inducing inputs in the space of patches, as opposed to the space occupied by the training data items in the dataset X. Accordingly, the inducing inputs are referred to as inducing patches. In the case of inducing patches, the matrices $K_{uu}$ and $K_{uf}$ have elements given by Equations (12) and (13):

$$K_{uu}[m,n] = k_g(z_m, z_n), \quad (12)$$

and $$K_{uf}[m, n] = \sum_{p=1}^{P} k_g(z_m, x_n^{[p]}). \quad (13)$$

In the case of inducing patches, evaluating $K_{uu}$ requires $M^2$ evaluations of the kernel $k_g$. Evaluating $K_{uf}$ requires MNP evaluations of the kernel $k_g$. For comparison, placing the inducing inputs in the space of the training data results in the evaluation of $K_{uu}$ requiring $M^2P^2$ evaluations of the kernel $k_g$ and the evaluation of $K_{uf}$ requires $NMP^2$ evaluations of the kernel $k_g$. In either case, evaluating the diagonal elements of $K_{ff}$ requires $NP^2$ evaluations of the kernel $k_g$. Placing the inducing inputs in the space of patches significantly reduces the computational cost of evaluating the ELBO and derivatives of the ELBO, and therefore the computational cost of the optimising the parameters. In order to further reduce the computational cost of optimisation, the present implementation employs stochastic optimisation in which minibatches of training data of size N'<<N are selected at random from X at each iteration of the optimisation. The computational cost of computing the elements of $K_{uf}$, computing the diagonal elements of $K_{ff}$, and the matrix algebra of Equation (15), is then proportional to N' as opposed to N. In other implementations, optimisation of variational parameters and hyperparameters may be performed in a distributed manner, with a set of processors computing the expectation terms in $\mathcal{L}$ (or in a minibatch) in parallel.

The KL term in Equation (8) is closed form as both p(u) and q(u) are Gaussian distributions. In the present implementation, the expectation terms in Equation (8), and the corresponding derivatives, are calculated using Gauss-Hermite quadrature, though in other implementations, other numerical methods such as Monte-Carlo sampling may be used.

Figure 4:
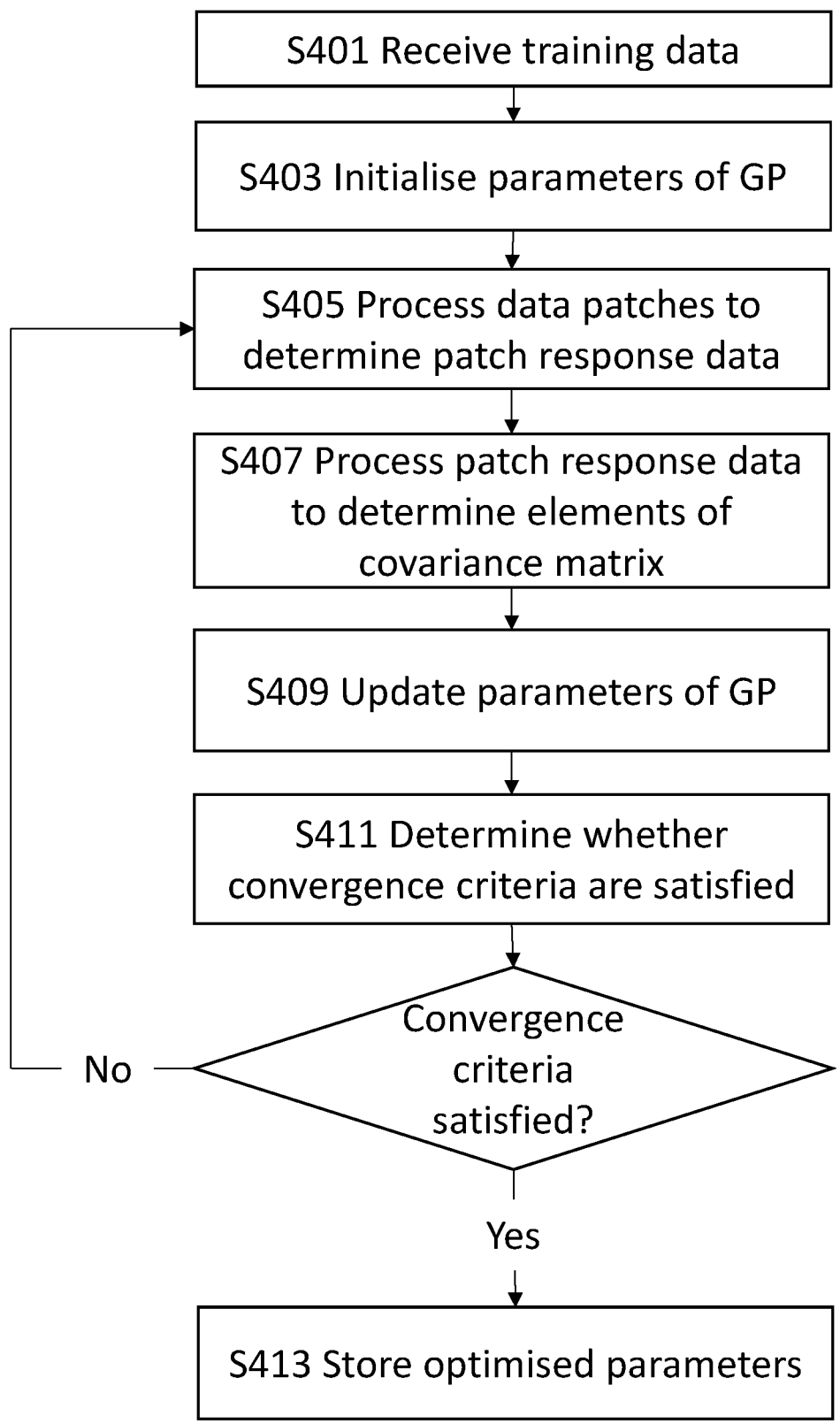
FIG. 4 shows a flow diagram representing a method of training a computer system to classify input data.

In the present implementation, optimising the variational parameters, the inducing inputs, and the hyperparameters, is referred to as the training phase. FIG. 4 shows an example of a method executed by a computer system for implementing a training phase for binary classification. The computer system receives, at S401, training data including the set X of training data items. The training data is labelled to indicate whether each training data item is associated with a given class label. For example, each training data item $x_n$ may be labelled with a value $y_n \Sigma(0,1)$, where 1 indicates that the data item is associated with the given class label, and 0 indicates that the training data item is not associated with the given class label.

The computer system initialises, at S403, parameters of a GP q($f$) for approximating the posterior process p($f$|y). In the implementation described above, initialising the parameters of the GP includes initialising the parameters m, L, Z, along with the hyperparameters of the global response kernel k. In the present implementation, the parameters m, L are initialised randomly, and the inducing inputs (referred to in this example as inducing patches), are initialised as patches sampled from the training data, and are assigned corresponding initial position vectors. It will be appreciated that other approaches for initialising the parameters are equally valid and may be used without departing from the scope of the invention, for example using K-means clustering of the training data. In the present implementation, the hyperparameters of the global response kernel are initialised randomly, though in other examples user-defined initial values may be chosen for one or more of the variational parameters (for example, in the case of the product kernel of Equation (5), the length scale $l_{loc}$ may be initialised to the width W or the height H of images within the training data, such that the location component $k_{loc}$ would be expected to capture location-based information on the scale of the images).

The computer system processes, at S405, pairs of data patches from the training data, using the patch response kernel $k_g$, to determine entries of the covariance matrix $K_{ff}$. In the present implementation, the computer system determines diagonal entries of the covariance matrix $K_{ff}$, and further determines entries of the covariance matrices $K_{uf}$ and $K_{uu}$. Determining the entries of the covariance matrices includes processing pairs of the training data patches and/or inducing patches, using the patch response kernel $k_g$, to determine patch response data, and processing the patch response data, using the global response kernel, to determine the entries of the covariance matrices. As discussed above, the patch response kernel takes into account the locations associated with the pair of patches.

The computer system iteratively updates the parameters of the GP q ($f$) to force the GP q($f$) to fit the training data. In the present implementation, the computer system updates, at S407, the parameters using a gradient-based optimisation method, to increase the value of the ELBO. The value of the ELBO (and the gradient of the ELBO with respect to the parameters of the variational GP) is determined using the entries of the covariance matrices determined at S405, as shown by Equations (8) to (11). In some examples, mini-batch optimisation is used to reduce the computational cost of calculating the gradient of the ELBO. Furthermore, in some examples the hyperparameters and the inducing inputs are updated simultaneously with the variational parameters, or in a separate update step as described above.

The computer system determines, at S409, whether pre-defined convergence criteria are satisfied. Any suitable convergence criteria known in the art may be used. If the computer system determines that the convergence criteria are not satisfied, the method returns to S405. If the computer system determines that the convergence criteria are satisfied, the parameters of the GP are determined to be optimised, and the training phase is complete. The optimised parameters of the GP are stored at S411, and are ready to be used for classification, as will be described hereafter.

Classification Phase

Once the parameters of the GP have been optimised, the GP model has been trained and is ready to be used for classification of input data items. The posterior distribution p($f(x_*)$|y) of the global response function evaluated at a test item x, is approximated by q($f(x_*)$), which is given by Equation (14):

$$q(f(x_*)) = \mathcal{N}(f(x_*)|\mu_*, \sigma_*^2), \quad (14)$$

where $$\mu_* = k_u(x_*)^T K_{uu}^{-1} m, \quad (15)$$

and $$\sigma_*^2 = k(x_*, x_*) + k_u(x_*)^T K_{uu}^{-1}(S - K_{uu}) K_{uu}^{-1} k_u(x_*). \quad (16)$$

Provided that the inverted covariance matrix $K_{uu}^{-1}$ is stored during the training phase, the mean $\mu_*$ and variance $\sigma_*^2$ for a single test latent $f(x_*)$ are calculated in $O(MP+M^2)$ floating point operations. The predictive probability of the test point $x_*$ being associated with the test label $\gamma_*$ is given by Equation (17):

$$p(\gamma_*|y) = \int p(\gamma_*|f(x_*)) p(f(x_*)|y) df(x_*) \approx \int p(\gamma_*|f(x_*)) q(f(x_*)) df(x_*). \quad (17)$$

Since the likelihood is not conjugate to the posterior q($f(x_*)$), the integral in Equation (17) cannot be evaluated analytically. In the present implementation, Monte Carlo integration is performed to estimate the predictive probability, as shown in Equation (18):

$$\int p(y_* | f(x_*)) q(f(x_*)) df(x_*) \approx \frac{1}{K} \sum_{k=1}^{K} p(y_* | f^{(k)}(x_*)), \quad (18)$$

where $f^{(k)}(x_*) \sim q(f(x_*))$, and K is the number of Monte Carlo samples used to approximate the integral. In other implementations, other numerical methods may be used to approximate the integral of Equation (18).

Figure 5:
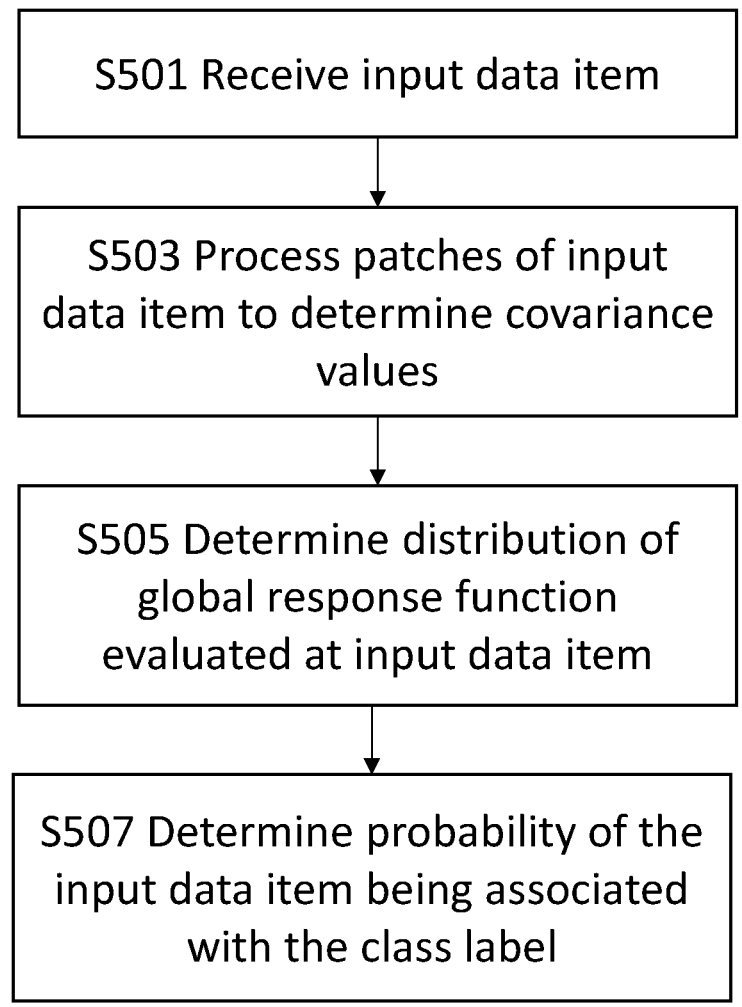
FIG. 5 shows a flow diagram representing a method of classifying input data.

FIG. 5 shows an example of a method executed by a computer system for implementing a classification phase for binary classification. Prior to the method of FIG. 5 being executed, a training phase is carried out (for example, the training phase described with reference to FIG. 4), such that the computer system stores a set of optimised parameters for the GP q($f$). The classification phase aims to determine a predictive probability of an input data item being associated with a class label.

The computer system receives, at S501, an input data item x, and processes, at S503, pairs of data patches from the input data item to determine patch response data. In the present implementation, the computer system determines the covariance value k($x_*$, $x_*$). In the present implementation, the computer system further determines entries of the covariance vector $k_u(x_*)$. Determining the covariance value includes processing pairs of the training data patches, using the patch response kernel $k_g$, to determine patch response data, and processing the patch response data, using the global response kernel, to determine the covariance value. As discussed above, the patch response kernel takes into account the locations associated with the pair of patches.

The computer system determines, at S505, the probability distribution q($f(x_*)$) of the global response function evaluated at the input data item, using the covariance value determined at S503 and the stored optimised parameters of the variational GP. The probability distribution q($f(x_*)$) in the present example is given by Equation (14), though in other examples the probability distribution may have a different form, for example a free-form distribution that may be sampled using MCMC.

The computer system determines, at S507, the predictive probability p($\gamma_*$|y) of the input data item $x_*$ being associated with the class label $\gamma_*$, using the determined probability distribution q($f(x_*)$) and the likelihood p($\gamma_*$|$f(x_*)$). In the example described above, the predictive probability p($\gamma_*$|y) is determined using Monte Carlo sampling, as shown in Equation (18).

Multi-Class Classification

For multi-class problems, in which data is to be classified into one of C>2 possible classes, an appropriate likelihood function is the softmax likelihood given by Equation (19):

$$p(y_n = \mathcal{C} | f(x_n)) = \frac{\exp(f^{\mathcal{C}}(x_n))}{\sum_{\mathcal{C}'} \exp(f^{\mathcal{C}'}(x_n))}, \quad (19)$$

for $\mathcal{C} = 1, \ldots, C$, where $f(x_n) = \{f^{\mathcal{C}}(x_n)\}_{\mathcal{C}=1}^{C}$. Other examples of appropriate likelihoods for multi-class problems include the robust-max likelihood. The method described above is extended to multi-class problems by associated a global response function $f^{\mathcal{C}}$ with each of the C classes, each having a GP prior as in Equation (3). A GP q($f^{\mathcal{C}}$) is assigned to each global response function $f^{\mathcal{C}}$, each GP having an independent set of parameters. The training phase and classification phase proceed in an identical manner to the binary case, with the parameters of each of the GPs being optimised together.

Results for Classification of Handwritten Digits

Table 1 shows results of classification of images from the publicly accessible Modified National Institute of Standards and Technology (MNIST) dataset using the classification method described above (referred to as TICK-GP), with the global response kernel k given by Equation (5) and with M=1000 inducing patches. The MNIST dataset contains 60000 training images of handwritten digits, and a further 10000 test images. The images are black and white and have size 28×28. The aim of the classification task is to predict the class labels 0-9 of each of the test images. For comparison, the same classification task was performed using a convolutional neural network (CNN) with two convolutional layers and two fully connected layers, and using a convolutional GP model with a patch response function that does not depend on locations of the image patches (in other words, a translation invariant convolutional GP model). Table 1 shows the top-n error for n=1,2,3, which is defined as the percentage of test images for which the correct class label is not within the top n predicted class probabilities. Table 1 also shows the negative log likelihood (NLL) for the full test set of 10000 images, and the NLL for the images misclassified by the classification method.

TABLE 1 classification results for MNIST images

| Metric | Convolutional GP | CNN | TICK-GP |
|---|---|---|---|
| Top-1 error | 1.7% | 0.65% | 0.83% |
| Top-2 error | 0.49% | 0.11% | 0.11% |
| Top-3 error | 0.19% | 0.04% | 0.05% |
| NLL full test set | 0.057 | 0.086 | 0.029 |
| NLL misclassified | 1.968 | 13.213 | 1.698 |

It is observed from Table 1 that TICK-GP outperforms the previous convolutional GP in terms of top-n error, though is marginally outperformed by the CNN in this respect.

However, TICK-GP far outperforms the CNN in terms of NLL, both for the full test set and for the set of misclassified images. This shows that the uncertainty predictions for TICK-GP are better calibrated than for the CNN. For example, the CNN often confidently misclassifies an image, whereas due to the error bars associated with the global response function in the present method, TICK-GP exhibits an appropriate degree of uncertainty for the misclassified images.

Figure 6:
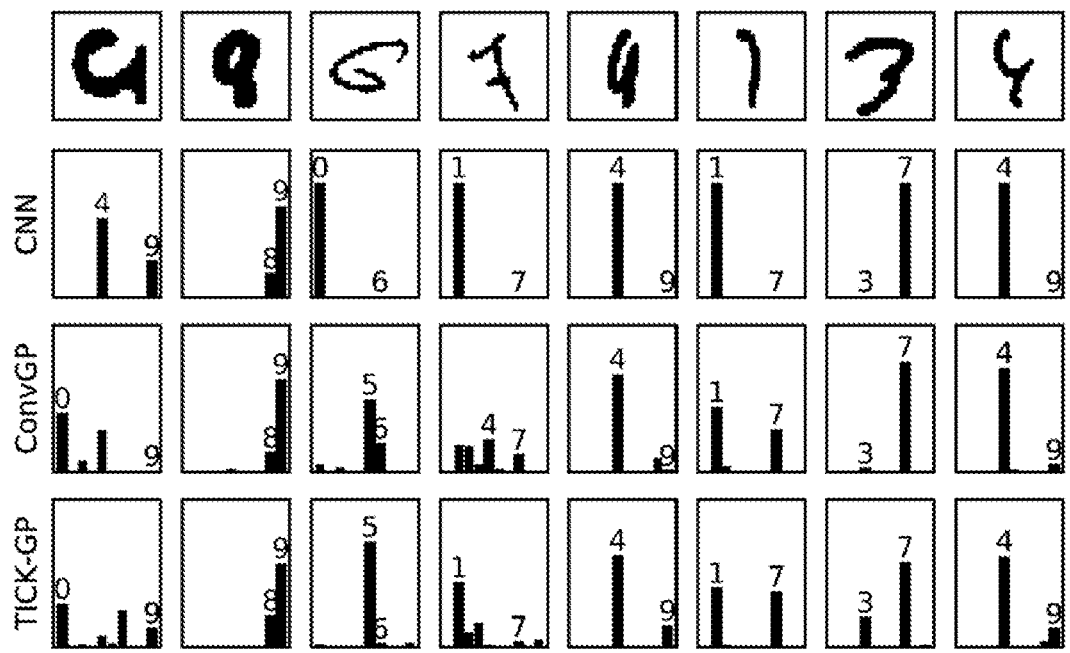
FIG. 6 shows classification results for a first set of handwritten digits.

FIG. 6 shows prediction probabilities for a random selection of misclassified images from the MNIST test dataset. It is observed that incorrect predictions made by TICK-GP are significantly more uncertain than those made by the CNN. The well-calibrated uncertainty predictions make TICK-GP particularly suitable for use cases where decisions are to be made on the basis of classification results, for example in medicine or other technical fields, where a confident incorrect prediction could result in a dangerous or otherwise undesirable decision being made.

Table 2 shows results of classification of the publicly available Semeion handwritten digit dataset, using the same models described above with reference to Table 1. In this case, the models were trained using the MNIST training dataset, and subsequently used to classify the Semeion images. The Semeion dataset includes 1593 black and white images of size 16×16, and for the present experiment zero padding is used to match the size of the MNIST training images. Classification of the Semeion dataset using models trained with MNIST images demonstrates the abilities of models to generalise, as the Semeion handwritten dataset has different writers to the MNIST dataset.

TABLE 2 classification results for Semeion images

| Metric | Convolutional GP | CNN | TICK-GP |
|---|---|---|---|
| Top-1 error | 36.72% | 14.44% | 16.26% |
| Top-2 error | 16.63% | 5.27% | 5.71% |
| Top-3 error | 9.10% | 1.95% | 1.76% |
| NLL full test set | 1.027 | 2.115 | 0.474 |
| NLL misclassified | 2.221 | 14.614 | 1.941 |

Similar observations are made in regard to Table 2 as those discussed above with reference to Table 1, showing that TICK-GP is capable of making well-calibrated uncertainty predictions for transfer learning tasks.

Figure 7:
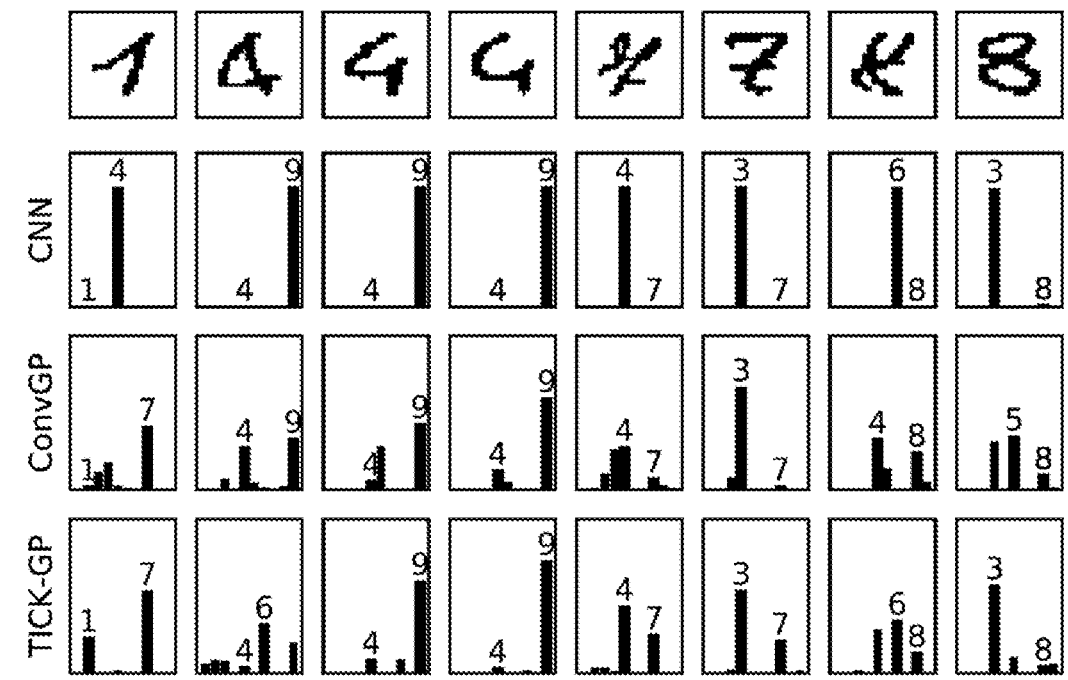
FIG. 7 shows classification results for a second set of handwritten digits.

FIG. 7 shows prediction probabilities for a random selection of misclassified images from the Semeion test dataset. Similar observations are made in regard to FIG. 7 as those discussed above with reference to FIG. 6.

Although in the above illustrative example digits are used as examples of classes, it will be appreciated that the described methods apply more generally to optical character recognition (OCR) in which classes may be other types of symbol, for example alphanumeric symbols and/or symbols from other alphabets such as the Greek or Russian alphabets, or logograms such as Chinese characters or Japanese kanji. Moreover, the methods described herein may be used in a broad range of image classification applications, for example:

face recognition for applications such as biometric security and automatic tagging of photographs online, in which different human faces correspond to different classes;

image organisation, in which different classes of images such as landscapes, human portraits, or specific types of object, are grouped and stored accordingly (or associated with corresponding metadata) in a database such as a personal photo database;

keyword generation for online images, in which keywords corresponding to different classes of image appearing on a webpage are generated and can be incorporated into metadata for the website, enabling software tools such as search engines to identify webpages on the basis of visual content, in addition to text content;

object detection in autonomous vehicles or vehicles with advanced driver assistance systems, in which objects in the vicinity of a vehicle are identified and classified as, for example, pedestrians, vehicles, and road signs, such that control signals for an automatic driving system and/or alert signals for a human driver are generated in accordance with the identified objects;

robotics applications, in which a robot such as a warehouse robot identifies objects using image classification and generates control signals in dependence on the identified objects; and medical applications, in which symptoms appearing in a medical image such as a magnetic resonance imaging (MRI) scan or an ultrasound image are classified to assist in diagnosis.

Application to Audio Data

In the preceding sections, a classification method was described in the context of classifying images. It is noted that the described method is not limited to classification of images, and may be applied to any multi-dimensional data with a structured representation. A structured representation of a data item associates each element of the data item with a location that can be indexed (for example, a location of a pixel in an image). As a further example, the method described above may be used to classify audio data. Audio data is high-dimensional, and may be represented using various structured representations, two of which are described below with reference to FIGS. 8 and 9 respectively. An example application of audio data classification is predicting the genre of music contained within an audio file. Further applications appear in speech recognition, for example in which a portion of audio data may be classified as containing voiced or unvoiced sound, or the speech content of a portion of audio data may be classified, for example at a character, syllable, word or utterance level (where an utterance may include one or more words). Utterance classes may be defined broadly, for example as questions, statements, etc. Utterance classes may be defined more narrowly, for example questions may be classified as requests for verification, requests for quantification, requests for examples, disjunctive questions etc. Alternatively, or additionally, utterances may be classified as specific phrases, for example as commands used to control a voice-activated device such as a personal assistant.

Figure 8:
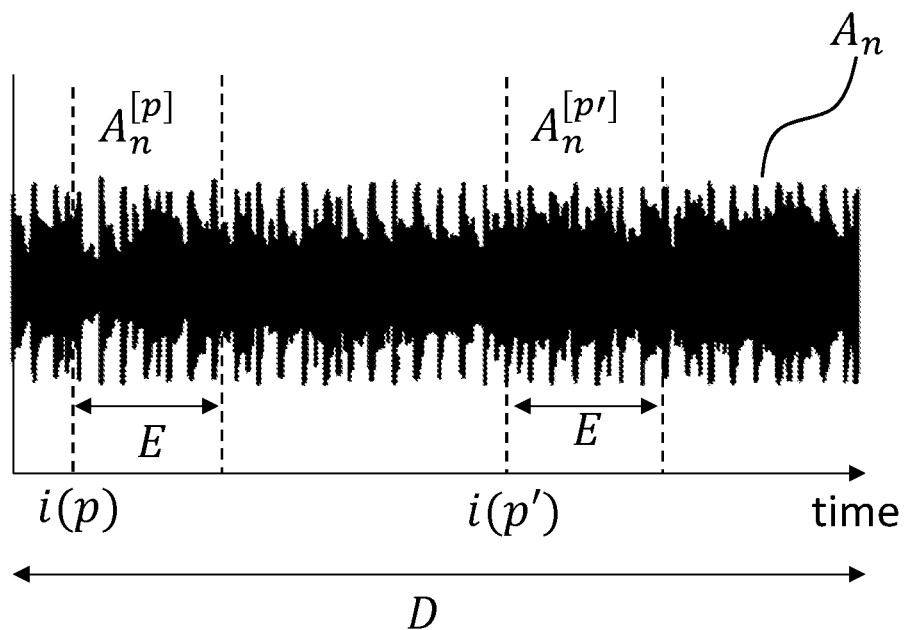
FIG. 8 shows a first structured representation of an audio file.

FIG. 8 shows a visual waveform representation of an audio file $A_n$ corresponding to an audio data vector $x_n$. In this example, each element of the audio data vector $x_n$ represents an overall power measurement associated with an audio sample. The audio file $A_n$ contains D audio samples, and accordingly the audio data vector $x_n$ contains D elements, such that $x_n \in \mathbb{R}^D$, with each element having an associated position in the structured representation shown in FIG. 8. The audio file $A_n$ contains P audio patches $\{A_n^{[p]}\}_{p=1}^P$, each containing E audio samples. The audio patches correspond to patch vectors $\{x_n^{[p]}\}_{p=1}^P$. In FIG. 8, two audio patches $A_n^{[p]}$ and $A_n^{[p']}$ are shown, each containing series of samples and having starting points at sample i(p) and sample i(p') in the structured representation respectively.

The method described above may be applied directly to the classification of audio files represented as shown in FIG. 8, with the modification that the patch response kernel $k_g$ depends on the sample-wise positions of the audio patches within the structured representation of the audio file. The GP prior for the patch response function g is therefore given by Equation (20):

$$g \sim GP(0, k_g((x_n^{[p]}, i(p)), (x_m^{[p']}, i(p')))). \quad (20)$$

Figure 9:
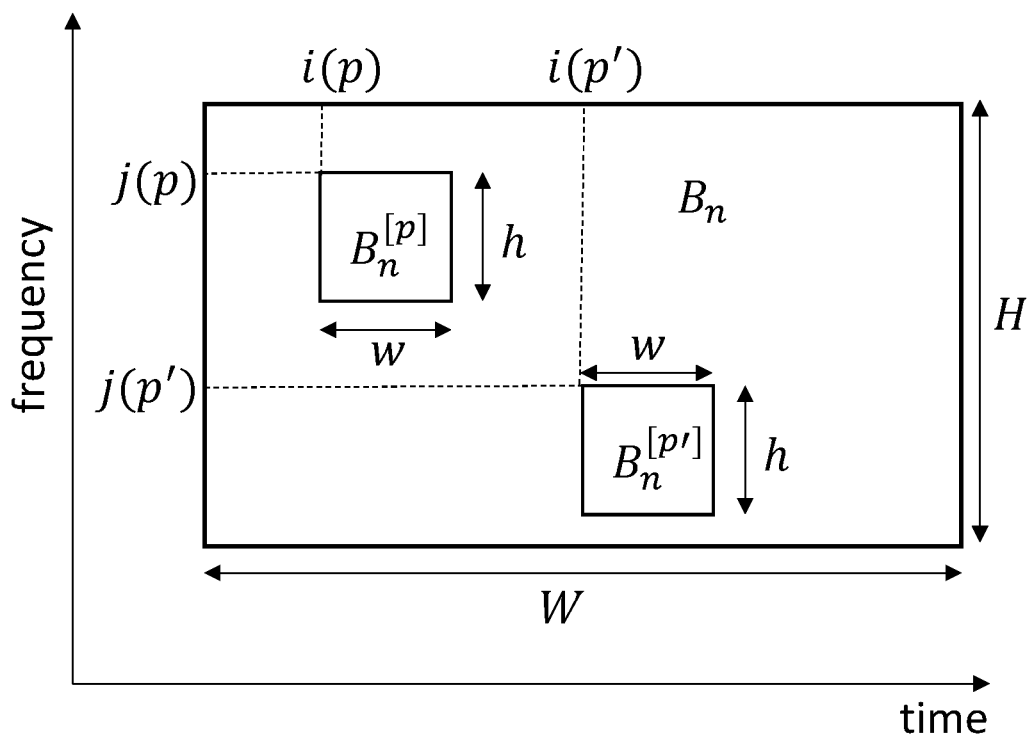
FIG. 9 shows a second structured representation of an audio file.

In the example of FIG. 8, an audio file is treated as a D-dimensional data item, where D is the number of audio samples in the audio file. In an alternative implementation, an audio file may be represented spectrally, for example using a Mel-frequency cepstrum, although other spectral representations are possible. FIG. 9 shows a spectral representation of an audio file $B_n$ using a Mel-frequency cepstrum. The audio file is represented at each of a set of W discrete times by a set of H Mel-frequency cepstral coefficients, resulting in a D-dimensional data item, where D=H× W. The audio file $B_n$ contains P audio patches $\{B_n^{[p]}\}_{p=1}^P$, with each audio patch containing E=h×w Mel-frequency cepstral coefficients. The method described above for classification of images may be applied directly to audio files represented as shown in FIG. 9, where the patch response kernel $k_g$ depends on the locations of the audio patches in the structured representation of the audio file.

Application to Regression Problems

In addition to being applicable to classification problems, the method described above is further applicable to regression problems. Regression problems require input data to be mapped to continuous output variables, as opposed to discrete classes. The method described above is applicable, in particular, to regression on image data and/or audio data. Examples of regression on image data include medical applications, for example in which images of tumours or other symptoms of a disease are mapped to an output variable indicative of the stage of the disease. Other examples of regression on image data include age estimation, facial landmark estimation, and image registration. An example of regression on audio data includes emotion estimation from speech.

In order for the method described above to be applied to regression problems, a likelihood must be provided that is continuous in an output variable $\gamma_n$ corresponding to the data item $x_n$. For the well-known additive Gaussian noise model, the likelihood is given by Equation (21):

$$p(\gamma_n | f(x_n)) = \mathcal{N}(\gamma_n | f(x_n), \sigma_n^2). \quad (21)$$

The method proceeds analogously to that of the classification case.

Example Computer System

Figure 10:
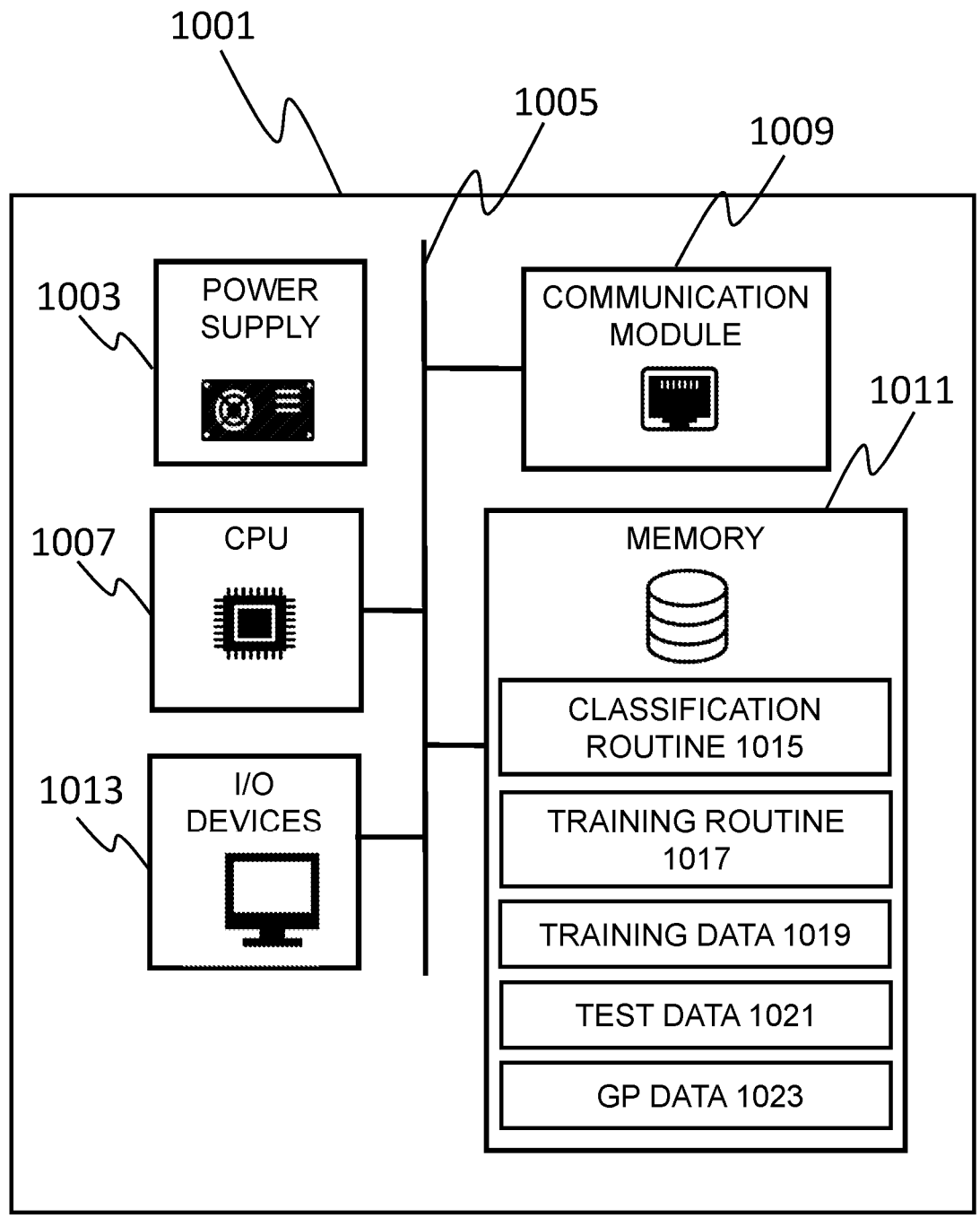
FIG. 10 shows an example computing device for classifying input data.

FIG. 10 shows an example of a computer system 1001 arranged to classify input data in accordance with the present method. In this example, the computer system 1001 is arranged to perform both the training phase and the classification phase. The computer system 1001 includes a power supply 1003 and a system bus 1005. The system bus 1005 is connected to: a CPU 1007; a communication module 1009; a memory 1011; and input/output devices 1013. The memory 1011 holds: a classification routine 1015; a training routine 1017; training data 1019; test data 1021; and GP data 1013. The GP data includes variational parameters and hyperparameters. Executing the training routine 1017 causes the CPU 1007 to process the training data 1019 in accordance with FIG. 4 to update the GP data 1023. Executing the classification routine 1015 causes the CPU to process the test data 1021 in accordance with FIG. 5 to determine class probability predictions for the test data 1021.

In other examples, the training phase may be performed by a first computer system, and the classification phase may be performed by a second, different computer system remote from the first computer system. In such examples, after performing the training phase, the first computer system must transmit the updated GP data to the second computer system before the second computer system performs the classification phase. Either or each of these phases may be performed using a distributed computer system (for example, for distributed computation of the ELBO in the training phase, as discussed above).

Further Embodiments and Modifications

The above embodiments are to be understood as illustrative examples of the invention. Further embodiments of the invention are envisaged. For example, the method described herein may be used to classify video data comprising a sequence of image frames. Video data comprising a sequence of image frames may be represented using a structured representation where two dimensions are equivalent to the structured representation of FIG. 1, and a third dimension represents time. A structured representation of video data comprising image data and audio data may have four, five or more dimensions, depending on the representation of the image frames and the audio data.

In another example, the method described herein may extended to deep GP architectures based on a composition of functions $f(\bullet)=f_L(\ldots,f_2(f_1(\bullet)))$, where each component function $f_l$ is given a GP prior such that $f_l \sim GP(\mu_l(\bullet), k_l(\bullet,\bullet))$. In some examples, the kernel $k_L$ of the final layer is the TICK described above. In some examples, one or more of the layers l=1, . . . , L of the deep GP may be a multi-output GP over a vector-valued response function $f_l(x)=\{g_l(x^{[p]})\}_{p=1}^P$, where $g_l$ is a patch response function as described above. In such examples, each component multi-output GP is characterised by a tensor-valued global response kernel given by the covariance between different outputs $f_{l,p}$, $f_{l,p'}$ for different inputs $x_m$, $x_n$ as shown in Equation (22):

$$k_{l,p,p'}(x_m, x_n) = \mathbb{C}[f_{l,p}(x_m), f_{l,p'}(x_n)] = k_{g_l}(x_m^{[p]}, x_n^{[p'])}). \quad (22)$$

The global response kernel of Equation (22) is referred to as the Multi-Output Translation Insensitive Convolutional Kernel (MOTICK). In some examples, multiple MOTICK layers may be implemented within a deep GP (or a combination of MOTICK layers and other multi-output GP layers such as other convolutional GP layers), with or without a final TICK layer. For deep GPs, the joint density is defined by Equation (23):

$$p(\{y_n\}, \{h_{n,l}\}, \{f_l(\bullet)\}) = \prod_{n=1}^N p(y_n | h_{n,L}) \prod_{l=1}^L p(h_{n,l} | h_{n,l-1}, f_l(\bullet)) p(f_l(\bullet)), \quad (23)$$

in which the form of $p(h_{n,l}|h_{n,l-1}, f_l(\bullet))$ determines how the output vector $h_{n,l}$ of a given GP layer depends on the output of the response function and the input vector $h_{n,l-1}$ for that layer, and may be chosen to be stochastic or deterministic. In a specific deterministic example, the output of the layer is equal to the output of the response function, in which case $p(h_{n,l}|h_{n,l-1}, f_l(\bullet))=\delta(h_{n,l}-f(h_{n,l-1}))$. It is noted that $h_{n,l}$ within a given layer is determined by processing an input data item $x_n$ using one or more preceding GP layers of the deep GP. Furthermore, $h_{n,l}$ is a vector of elements arranged in conformity with a structured representation having an associated co-ordinate system, which may or may not correspond to the co-ordinate system of the training data item.

For a deep GP, the variational Bayesian method described above may be applied, with each layer having an independent set of inducing patches $Z^l=\{z_m^l\}_{m=1}^{M_l}$ and associated inducing variables $u_l=\{f_l(z_m^l)\}_{m=1}^{M_l}$. The resulting ELBO is given by Equation (24):

$$\mathcal{L} = \sum_{n=1}^N \mathbb{E}_{q(\{h_{n,l}\},\{f_l(\bullet)\})}[\log p(y_n | h_{n,L})] - \sum_{l=1}^L KL[q(u_l)\|p(u_l)], \quad (24)$$

where the approximate posterior density for the deep GP is given by $$q(\{h_{n,l}\}, \{f_l(\bullet)\}) = \prod_{n=1}^N \prod_{l=1}^L p(h_{n,l} | h_{n,l-1}, f_l(\bullet)) q(f_l(\bullet)).$$

The approximate posterior density $q(f_l(\bullet))$ for each layer is given by Equations (9)-(11) above, with the input vectors $x_n$, $x_m$ replaced by the input vectors $h_{n,l-1}$, $h_{m,l-1}$ for the layer. It will be appreciated that the classification phase for deep GPs is analogous to that described above for a single layer GP, but using the approximate posterior density $q((h_{n,l}, \{f_l(\bullet)\})$.

Although GP models are capable of learning complex nonlinear structures due to the flexibility of the GP prior (in contrast with neural networks, which are only able to learn nonlinear structures by virtue of deep network architectures), including a deep GP structure may further improve the learning capacity of the GP model described above, whilst continuing to provide well-calibrated uncertainty predictions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical character recognition, OCR, system comprising:
   processing circuitry; and
   memory circuitry storing values of a set of parameters for a Gaussian process, GP, and computer-readable instructions which, when executed by the processing circuitry, cause the processing circuitry to process an image of an unknown symbol to classify the image as belonging to a given class of a plurality of classes, each of the plurality of classes corresponding to a respective symbol, the processing comprising:
   determining, from the image, a vector of elements arranged in conformity with a structured representation of the image, the structured representation having an associated coordinate system;
   determining patches of the determined vector, each patch comprising a subset of the elements of the vector and being associated with a location within the co-ordinate system of the structured representation;
   processing pairs of the determined patches, using a patch response kernel, to determine patch response data;
   determining, using the patch response data and stored values of the set of parameters for the GP, a probability distribution of a global response function evaluated at the data item;
   determining, using the determined probability distribution, a probability of the image belonging to the given class; and
   classifying the image as belonging to the given class based on the determined probability of the image belonging to the given class,
   wherein the patch response kernel takes into account the locations associated with the pair of patches within the co-ordinate system of the structured representation.

2. The system of claim 1, configured to classify an image of an unknown handwritten symbol into one of the plurality of classes.

3. The system of claim 1, wherein each class of the plurality of image classes corresponds to a respective alphanumeric symbol.

4. A non-transient storage medium comprising machine-readable instructions which, when executed by a computing system, cause the computing system to:
   determine, for a data item comprising a plurality of elements arranged in conformity with a structured representation having an associated co-ordinate system, a vector of elements arranged in conformity with the structured representation;

determine patches of the determined vector, each patch comprising a subset of the elements of the vector and being associated with a location within the co-ordinate system of the structured representation;

process pairs of the determined patches, using a patch response kernel, to determine patch response data;

determine, using the patch response data and a stored set of parameters of a GP, a probability distribution of a global response function evaluated at the data item; and determine, using the determined probability distribution, a probability of the data item being associated with a given class of a plurality of classes, wherein the patch response kernel takes into account the locations associated with the pair of patches within the co-ordinate system of the structured representation.

5. The non-transient storage medium of claim 4, comprising further machine-readable instructions which, when executed by the computing system, cause the computing system to classify the data item as belonging to the given class based on the determined probability of the data item being associated with the given class.

6. The non-transient storage medium of claim 4, wherein:
the data item is an image; and
the co-ordinate system of the structured representation comprises one or more spatial co-ordinates.

7. The non-transient storage medium of claim 4, wherein:
the data item is an audio file; and
the co-ordinate system of the structured representation comprises a temporal co-ordinate.

8. The non-transient storage medium of claim 7, wherein the data item is an audio file comprising speech and each class of the plurality of classes corresponds to a respective utterance class.

9. The non-transient storage medium of claim 4, wherein the patch response kernel takes into account a distance between the locations associated with the pair of patches within the co-ordinate system of the structured representation.

10. The non-transient storage medium of claim 4, wherein the patch response kernel is a product of a patch component and a location component, wherein the patch component takes into account the elements of the pair of patches, and the location component takes into account the locations associated with the pair of patches within the co-ordinate system of the structured representation.

11. The non-transient storage medium of claim 4, wherein the set of parameters of the GP comprises a length scale hyperparameter associated with the patch response kernel.

12. The non-transient storage medium of claim 4, wherein the GP is a layer within a deep GP comprising one or more further GP layers.

13. The non-transient storage medium of claim 12, wherein determining the vector of elements comprises processing the data item using one of the one or more further GP layers.

14. A computer-implemented method of training a computer system to determine a probability of a data item being associated with a given class of a plurality of classes, the method comprising, at a computing system:

receiving training data comprising a plurality of training data items, each training data item being labelled under a respective class of the plurality of classes and comprising a plurality of elements arranged in conformity with a structured representation having an associated co-ordinate system;

determining, for each of the training data items, a vector of elements arranged in conformity with the structured representation;

determining patches of the determined vectors, each patch comprising a subset of the elements of a respective one of the determined vectors and being associated with a location within the co-ordinate system of the structured representation;

initialising values of a set of parameters for a GP; and iteratively:
processing pairs of the determined patches, using a patch response kernel, to determine patch response data; and
updating the values of the set of parameters for the GP in dependence on the determined patch response data, wherein the patch response kernel takes into account the locations associated with the pair of patches within the co-ordinate system of the structured representation.

15. The method of claim 14, wherein:
each training data item is an image; and
the co-ordinate system of the structured representation comprises one or more spatial co-ordinates.

16. The method of claim 14, wherein:
each training data item is an audio file; and
the co-ordinate system of the structured representation comprises a temporal co-ordinate.

17. The method of claim 16, wherein each training data item is an audio file comprising speech and each class of the plurality of classes corresponds to a respective utterance class.

18. The method of claim 14, wherein the patch response kernel takes into account a distance between the locations associated with the pair of patches within the co-ordinate system of the structured representation.

19. The method of claim 14, wherein the patch response kernel is a product of a patch component and a location component, wherein the patch component takes into account the elements of the pair of patches, and the location component takes into account the locations associated with the pair of patches within the co-ordinate system of the structured representation.

20. The method of claim 14, wherein the GP is a layer within a deep GP comprising one or more further GP layers.

* * * * *